US008953518B2

United States Patent
Lee et al.

(10) Patent No.: US 8,953,518 B2
(45) Date of Patent: Feb. 10, 2015

(54) METHOD AND APPARATUS FOR ACQUIRING INITIAL SYNCHRONIZATION USING RELAY-AMBLE IN WIRELESS COMMUNICATION SYSTEM

(75) Inventors: Yong Su Lee, Daejeon-si (KR); Dae Geun Park, Daejeon-si (KR); Young Il Park, Daejeon-si (KR); Won Ryu, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 192 days.

(21) Appl. No.: 13/526,934

(22) Filed: Jun. 19, 2012

(65) Prior Publication Data
US 2013/0155939 A1 Jun. 20, 2013

(30) Foreign Application Priority Data
Dec. 15, 2011 (KR) .................. 10-2011-0135740

(51) Int. Cl.
*H04W 56/00* (2009.01)
(52) U.S. Cl.
USPC ........................................ 370/315
(58) Field of Classification Search
CPC .......... H04B 7/15528; H04W 56/005; H04W 56/0085
USPC ................................ 370/311, 315
See application file for complete search history.

(56) References Cited

U.S. PATENT DOCUMENTS

| | | | |
|---|---|---|---|
| 8,681,734 B2 * | 3/2014 | Cho et al. ................. | 370/330 |
| 2003/0224829 A1 * | 12/2003 | Ishiguro et al. ............ | 455/562.1 |
| 2007/0081483 A1 * | 4/2007 | Jang et al. ................. | 370/315 |
| 2007/0201402 A1 * | 8/2007 | Cho et al. ................. | 370/330 |
| 2008/0144756 A1 * | 6/2008 | Park et al. ................. | 375/359 |
| 2010/0278137 A1 * | 11/2010 | Kwon et al. ............... | 370/330 |
| 2011/0261749 A1 * | 10/2011 | Youn et al. ............... | 370/315 |

FOREIGN PATENT DOCUMENTS

| | | |
|---|---|---|
| KR | 1020060066877 A | 6/2006 |
| KR | 1020100124457 A | 11/2010 |
| KR | 1020110028233 A | 3/2011 |

OTHER PUBLICATIONS

Hyoungsoo Lim, et al; "Initial Synchronization for WiBro", 2005 Asia-Pacific Conference on Communications, Perth, Western Australia, Oct. 3-5, 2005, pp. 284-288.

* cited by examiner

*Primary Examiner* — Charles C Jiang
*Assistant Examiner* — Thad Defauw
(74) *Attorney, Agent, or Firm* — Ladas & Parry LLP

(57) ABSTRACT

A method and an apparatus for acquiring initial synchronization in a wireless communication system are provided. A relay station determines whether or not the initial synchronization is acquired, determines a start position of a frame using a peak of an autocorrelation signal detected based on a preamble and a relay-amble (R-amble) received from a base station in the case in which the initial synchronization is not acquired, and determines the start position of the frame using a peak of an autocorrelation signal detected based on the relay-amble received from the base station in the case in which the initial synchronization is acquired.

18 Claims, 12 Drawing Sheets

METHOD AND APPARATUS FOR ACQUIRING INITIAL SYNCHRONIZATION USING RELAY-AMBLE IN WIRELESS COMMUNICATION SYSTEM

CROSS-REFERENCE TO RELATED APPLICATIONS

This application claims the benefit of priority of Korean Patent application No. 10-2011-0135740 filed on Dec. 15, 2011, which is incorporated by reference.

BACKGROUND OF THE INVENTION

1. Field of the Invention

The present invention relates to wireless communication, and more particularly, to a method and an apparatus for acquiring initial synchronization using a relay-amble in a wireless communication system.

2. Related Art

The institute of electrical and electronics engineers (IEEE) 802.16e standard has been adopted as a title of 'WMAN-OFDM TDD' as a sixth standard for the international mobile telecommunication (IMT) 2000 in the ITU-radiocommunication sector (ITU-R) under the international telecommunication union (ITU) in 2007. The ITU-R has prepared the IMT-advanced system as the next generation 4G telecommunication standard after the IMT-2000. The IEEE 802.16 working group (WG) has determined the progress of the IEEE 802.16m project for the purpose of making an amendment standard of an existing IEEE 802.16e as a standard for the IMT-advanced system at the end of 2006. As seen from the above purpose, the IEEE 802.16m standard involves two aspects of the continuity of the past which is the amendment of the IEEE 802.16e standard and the continuity of the future which is a standard for the next generation IMT-advanced system. Therefore, the IEEE 802.16m standard needs to satisfy all the advanced requirements for the IMT-Advanced system while maintaining compatibility with the IEEE 802.16 standard based mobile WiMAX system.

Recently, a wireless communication system including a relay station (RS) has been developed. The relay station serves to increase a cell coverage and improve transmission performance. A base station serves a mobile station positioned at a coverage boundary thereof through the relay station, thereby making it possible to increase the cell coverage. In addition, the relay station improves reliability of signal transmission between the base station and the mobile station, thereby making it possible to increase transmission capacity. Even though the mobile station is in the coverage of the base station, in the case in which the mobile station is positioned in a shadow area, the relay station may also be used.

A preamble is a signal transmitted from the base station in order to perform initial synchronization between the base station and the mobile station. The mobile station detects an autocorrelation signal using repetitive characteristics of the preamble received from the base station and search a peak of an output of the autocorrelation signal, thereby making it possible to search a start point of a frame. When the mobile station searches the start point of the frame as described above, it may generate time division duplex (TDD) switch signals of downlink (DL) and uplink (UL) periods based on the start point of the frame. Since the base station recognizes a reference time in advance and performs downlink transmission according to the reference time, it needs not to again search the start point of the frame.

In the case in which the relay station is introduced, a relay-amble (R-amble) may be additionally transmitted, in addition to the preamble. The reason is that a frame structure in the case in which the relay station is introduced may be different from that of a frame of an existing wireless communication system. However, a method for acquiring initial synchronization using a relay-amble has not yet been discussed.

Therefore, a method for efficiently acquiring initial synchronization using a relay-amble in a wireless communication system into which a relay station is introduced has been demanded.

SUMMARY OF THE INVENTION

The present invention provides a method and apparatus for acquiring initial synchronization using a relay-amble in a wireless communication system. The present invention also provides determining of a start position of a frame based on a peak of an autocorrelation signal indicated by a relay-amble and setting an antenna control switch based on the determined start point of the frame.

In an aspect, a method for acquiring initial synchronization by a relay station in a wireless communication system is provided. The method includes determining whether or not the initial synchronization is acquired, determining a start position of a frame using a peak of an autocorrelation signal detected based on a preamble and a relay-amble (R-amble) received from a base station in the case in which the initial synchronization is not acquired, and determining the start position of the frame using a peak of an autocorrelation signal detected based on the relay-amble received from the base station in the case in which the initial synchronization is acquired.

The method may further include setting a relay antenna control switch to relay Rx=on and setting an access antenna control switch to access Rx=on in the case in which the initial synchronization is not acquired.

The method may further include setting a relay antenna control switch to relay Tx=on in a UL relay zone and setting an access antenna control switch to access Tx=on in a DL access zone in the case in which the initial synchronization is acquired.

The UL relay zone may be an area for the relay station to perform uplink transmission to the base station, and the DL access zone may be an area for the relay station to perform downlink transmission to a mobile station.

The determining of whether or not the initial synchronization is acquired may be indicated by an initial synchronization indicator.

When a value of the initial synchronization indicator is 0, it may indicate that the initial synchronization is not acquired, and when the value of the initial synchronization indicator is 1, it may indicate that the initial synchronization is acquired.

The method may further include after the determining of the start position of the frame, setting a value of the initial synchronization indicator to 1.

The start position of the frame may be positioned at a time elapsing from a time at which the peak of the autocorrelation signal detected based on the relay-amble is positioned by a transmit/receive transition gap (TTG)+a duration of a UL access zone+a relay transmit to receive transition interval (R-TTI)+a duration of a UL relay zone+a relay receive to transmit transition interval (R-RTI).

The preamble or the relay-amble may be received in a single OFDM symbol.

The preamble or the relay amble may include a three times repeated data period and a cyclic prefix (CP) positioned prior to the data period, and the CP may be generated by copying a portion of the data period.

In another aspect, a relay station in a wireless communication system is provided. The relay station includes a radio frequency (RF) unit transmitting or receiving a radio signal, and a processor connected to the RF unit, wherein the processor is configured to determine whether or not initial synchronization is acquired, determine a start position of a frame using a peak of an autocorrelation signal detected based on a preamble and a relay-amble (R-amble) received from a base station in the case in which the initial synchronization is not acquired, and determine the start position of the frame using a peak of an autocorrelation signal detected based on the relay-amble received from the base station in the case in which the initial synchronization is acquired.

DESCRIPTION OF EXEMPLARY EMBODIMENTS

Figure 1:
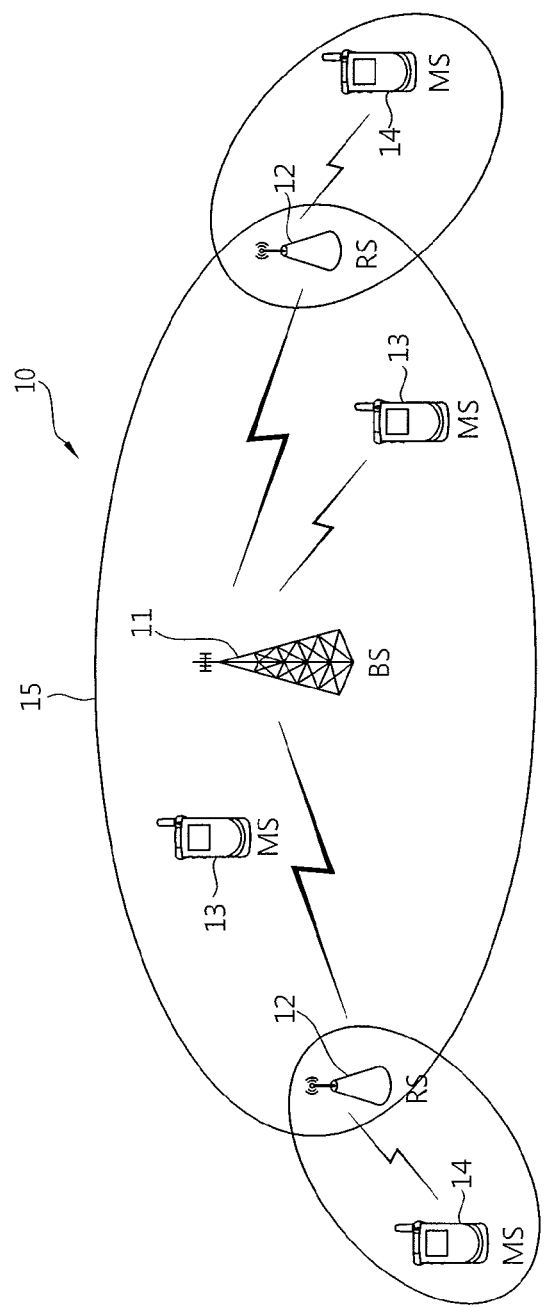
FIG. 1 shows a wireless communications system including a relay station.

Hereinafter, exemplary embodiments of the present invention will be described in detail with reference to the accompanying drawings so that those skilled in the art may easily practice the present invention. However, the present invention may be modified in various different ways and is not limited to the exemplary embodiments provided in the present description. In the accompanying drawings, portions unrelated to the description will be omitted in order to obviously describe the present invention, and similar reference numerals will be used to describe similar portions throughout the present specification. Further, when a detailed description is omitted, only a detailed description of portions that may be easily understood by those skilled in the art will be omitted.

Through the present specification and claims, unless explicitly described otherwise, "comprising" any components will be understood to imply the inclusion of other components rather than the exclusion of any other components.

The following technology may be used for various radio access systems, such as a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and the like. The CDMA may be implemented by radio technologies such as universal terrestrial radio access (UTRA) or CDMA 2000. The TDMA may be implemented by radio technologies, such as global system for mobile communications (GSM)/general packet radio service (GPRS)/enhanced data rates for GSM evolution (EDGE). The OFDMA may be implemented by radio technologies, such as IEEE 802.11 (Wi-Fi), IEEE 802.16 (WiMAX), IEEE 802-20, evolved-UTRA (E-UTRA), or the like. The IEEE 802.16m, which is evolved from the IEEE 802.16e, provides backward compatibility with the IEEE 802.16e based system. The UTRA is a portion of universal mobile telecommunications system (UMTS). The 3rd generation partnership project (3GPP) long term evolution (LTE), which is a portion of evolved UMTS (E-UMTS) using the E-UTRA, adopts the OFDMA in a downlink and adopts the SC-FDMA in an uplink. The LTE-A (Advanced) is evolved from the 3GPP LTE.

In order to make a description of the present invention obvious, the IEEE 802.16m will be mainly described. However, the technical spirit of the present invention is not limited thereto.

FIG. 1 shows a wireless communications system including a relay station.

Referring to FIG. 1, a wireless communication system 10 including a relay station includes at least one base station (BS) 11. Each base station 11 provides a communication service to a specific geographical area 15 generally referred to as a cell 15. The cell may be divided into a plurality of areas, each of which may be referred to as a sector. At least one cell may be present in a single base station. The base station 11 generally indicates a fixed station communicating with a mobile station 13 and may be referred to as other terms, such as an evolved-Node B (eNB), a base transceiver system (BTS), an access point, an access network (AN), an advanced BS (ABS), and the like. The mobile station 11 may perform functions such as connectivity, a control, and resource allocation between the relay station 12 and a mobile station 14.

The relay station (RS) 12 indicates a device relaying a signal between the base station 11 and the mobile station 14 and may be referred to as other terms such as a relay node (RN), a repeater, a relay device, an advanced RS (ARS), and the like. As a relay scheme used in the relay station, any scheme such as amplify and forward (AF), decode and forward (DF), and the like, may be used. However, the technical spirit of the present invention is not limited thereto.

The mobile stations (MSs) 13 and 14 may be fixed or have mobility and may be referred to as other terms such as an advanced mobile station (AMS), a user terminal (UT), a subscriber station (SS), a wireless device, a personal digital assistant (PDA), a wireless modem, a handheld device, an access terminal (AT), a user equipment (UE), and the like. Hereinafter, a macro mobile station indicates a mobile station directly communicating with the base station, and a relay station mobile station indicates a mobile station communicating with the relay station. Even though the macro mobile station 13 is positioned in a cell of the base station 11, the macro mobile station 13 may communicate with the base station 11 through the relay station 12 in order to improve a transmission speed due to a diversity effect.

The mobile station pertains to a single cell, and the cell to which the mobile station pertains is called a serving cell. A base station providing a communication service to the serving cell is called a serving base station. Since the wireless communication system is a cellular system, other cells neighboring to the serving cell are present. Other cells neighboring to the serving cell are called as a neighbor cell. A base station providing a communication service to the neighbor cell is called a neighbor base station. The serving cell and the neighbor cell are relatively determined based on the mobile station.

This technology may be used in a downlink (DL) and an uplink (UL). Generally, a downlink between the base station and the mobile station means communication from the base station to the macro mobile station, and an uplink therebetween means communication from the macro mobile station to the base station. A downlink between the base station and the relay station means communication from the base station to the relay station, and an uplink therebetween means communication from the relay station to the base station. A downlink between the relay station and the relay station mobile station means communication from the relay station to the relay station mobile station, and an uplink therebetween means communication from the relay station mobile station to the relay station. In the downlink, a transmitter may be a portion of the base station or the relay station, and a receiver may be a portion of the mobile station or the relay station. In the uplink, the transmitter may be a portion of the mobile station or the relay station, and the receiver may be a portion of the base station or the relay station.

Figure 2:
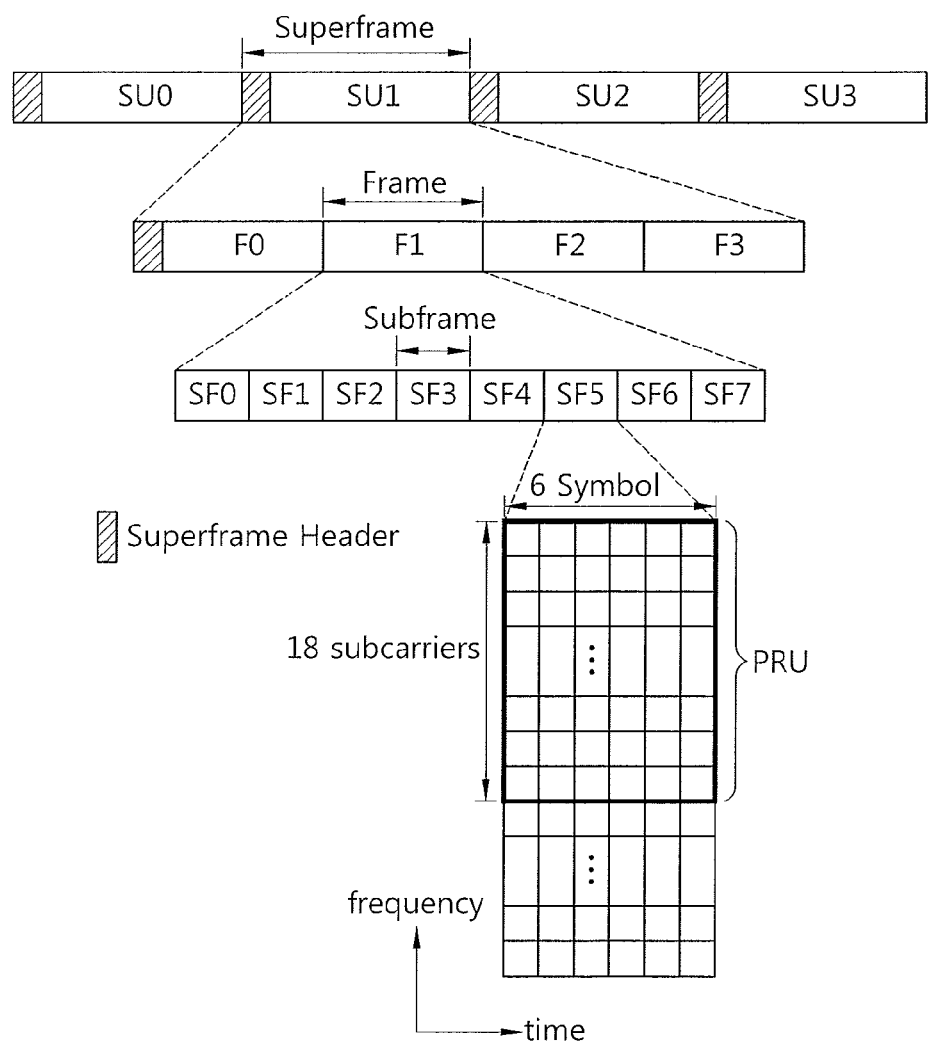
FIG. 2 shows an example of a frame structure.

FIG. 2 shows an example of a frame structure.

Referring to FIG. 2, a superframe (SF) includes a superframe header (SFH) and four frames (F0, F1, F2, and F3). All of the lengths of each frame in the superframe may be the same as each other. Although the case in which each superframe has a size of 20 ms and each frame has a size of 5 ms is described by way of example, the present invention is not limited thereto. A length of the superframe, the number of frames included in the superframe, the number of subframes included in the frame, and the like, may be variously changed. The number of subframes included in the frame may be variously changed according to a channel bandwidth and a length of a cyclic prefix (CP).

A single frame includes a plurality of subframes (SF0, SF1, SF2, SF3, SF4, SF5, SF6, and SF7). Each subframe may be used for uplink transmission or downlink transmission. A single subframe includes a plurality of orthogonal frequency division multiplexing (OFDM) symbols or orthogonal frequency division multiple accesses (OFDMAs) in a time domain and a plurality of subcarriers in a frequency domain. The OFDM symbol, which is to represent a single symbol period, may be referred to as other names, such as an OFDM symbol, an SC-FDMA symbol, or the like, according to a multiple access scheme. The subframe may be configured of include 5, 6, 7, or 9 OFDM symbols, but is only an example. The number of OFDM symbols included in the subframe is not limited. The number of OFDMA symbols included in the subframe may be variously changed according to a channel bandwidth and a length of CP. A type of subframe may be defined according to the number of OFDMA symbols included in the subframe. For example, a type-1 subframe may be defined as including 6 OFDMA symbols, a type-2 subframe may be defined as including 7 OFDMA symbols, a type-3 subframe may be defined as including 5 OFDMA symbols, and a type-4 subframe may be defined as including 9 OFDMA symbols. A single frame may include the same type of subframes. Alternatively, a single frame may include different types of subframes. That is, the numbers of OFDMA symbols included in each subframe in a single frame may be the same or different. Alternatively, the number of OFDMA symbols of at least one subframe in a single frame may be different from those of remaining subframes in the single frame.

A time division duplex (TDD) scheme or a frequency division duplex (FDD) scheme may be applied to the frame. In the TDD scheme, each subframe is used for the uplink transmission or the downlink transmission at the same frequency at different times. That is, the subframes in the frame according to the TDD scheme are divided into an uplink subframe and a downlink subframe in a time domain. In the FDD scheme, each subframe is used for the uplink transmission or the downlink transmission at different frequencies at the same time. That is, the subframes in the frame according to the FDD scheme are divided into an uplink subframe and a downlink subframe in a frequency domain. The uplink transmission and the downlink transmission may occupy different frequency bands and may be made at the same time.

The SFH may carry an essential system parameter and system configuration information. The SFH may be positioned in a first subframe in the superframe. The SFH may occupy final 5 OFDMA symbols of the first subframe. The superframe header may be divided into a primary SFH (P-SFH) and a second SFH (S-SFH). The P-SFH may be transmitted per each superframe. Information transmitted through the S-SFH may be divided into three sub-packets, that is, S-SFH SP1, S-SFH SP2, and S-SFH SP3. The respective sub-packets may be periodically transmitted at different periods. Importance of information transmitted through the S-SFH SP1, the S-SFH SP2, and the S-SFH SP3 may be different, the S-SFH SP1 may be transmitted at the shortest period, and the S-SFH SP3 may be transmitted at the longest period. The S-SFH SP1 may include information on network re-entry and have a transmission period of 40 ms. The S-SFH SP2 may include information on initial network entry and network discovery and have a transmission period of 80 ms. The S-SFH SP3 may include remaining important system information and have a transmission period of 160 ms or 320 ms.

A single OFDMA symbol includes a plurality of subcarriers, wherein the number of subcarriers is determined according to a size of FFT. There are several types of subcarriers. Types of the subcarriers may be divided into a data subcarrier for data transmission, a pilot subcarrier for various estimations, a guard band, and a null carrier for a DC carrier. Parameters characterizing an OFDM symbol are BW, $N_{used}$, n, G, and the like. BW indicates a nominal channel bandwidth. $N_{used}$ indicates the number of used subcarriers (including a DC subcarrier). n indicates a sampling factor. This parameter determines a subcarrier spacing and a useful symbol time together with BW and $N_{used}$ G indicates a ratio of a CP time to a useful time.

The following Table 1 indicates OFDMA parameters.

TABLE 1

| Channel bandwidth, BW(MHz) | | | 5 | 7 | 8.75 | 10 | 20 |
|---|---|---|---|---|---|---|---|
| Sampling factor, n | | | 28/25 | 8/7 | 8/7 | 28/25 | 28/25 |
| Sampling frequency, $F_s$(MHz) | | | 5.6 | 8 | 10 | 11.2 | 22.4 |
| FFT size, $N_{FFT}$ | | | 512 | 1024 | 1024 | 1024 | 2048 |
| Subcarrier spacing, $\Delta f$(kHz) | | | 10.94 | 7.81 | 9.77 | 10.94 | 10.94 |
| Useful symbol time $T_b$(μs) | | | 91.4 | 128 | 102.4 | 91.4 | 91.4 |
| $G = 1/8$ | Symbol time, $T_s$(μs) | | 102.857 | 144 | 115.2 | 102.857 | 102.857 |
| | FDD | Number of OFDMA symbols per 5 ms frame | 48 | 34 | 43 | 48 | 48 |
| | | Idle time(μs) | 62.857 | 104 | 46.40 | 62.857 | 62.857 |
| | TDD | Number of OFDMA symbols per 5 ms frame | 47 | 33 | 42 | 47 | 47 |
| | | TTG + RTG(μs) | 165.714 | 248 | 161.6 | 165.714 | 165.714 |
| $G = 1/16$ | Symbol time, $T_s$(μs) | | 97.143 | 136 | 108.8 | 97.143 | 97.143 |
| | FDD | Number of OFDMA symbols per 5 ms frame | 51 | 36 | 45 | 51 | 51 |
| | | Idle time(μs) | 45.71 | 104 | 104 | 45.71 | 45.71 |
| | TDD | Number of OFDMA symbols per 5 ms frame | 50 | 35 | 44 | 50 | 50 |
| | | TTG + RTG(μs) | 142.853 | 240 | 212.8 | 142.853 | 142.853 |
| $G = 1/4$ | Symbol time, $T_s$(μs) | | 114.286 | 160 | 128 | 114.286 | 114.286 |
| | FDD | Number of OFDMA symbols per 5 ms frame | 43 | 31 | 39 | 43 | 43 |
| | | Idle time(μs) | 85.694 | 40 | 8 | 85.694 | 85.694 |
| | TDD | Number of OFDMA symbols per 5 ms frame | 42 | 30 | 38 | 42 | 42 |
| | | TTG + RTG(μs) | 199.98 | 200 | 136 | 199.98 | 199.98 |
| Number of Guard subcarriers | Left | | 40 | 80 | 80 | 80 | 160 |
| | Right | | 39 | 79 | 79 | 79 | 159 |
| Number of used subcarriers | | | 433 | 865 | 865 | 865 | 1729 |
| Number of PRU in type-1 subframe | | | 24 | 48 | 48 | 48 | 96 |

In Table 1, $N_{FFT}$ is the smallest power of two greater than $N_{used}$, a sampling factor ($F_s$) is floor(n·BW/8000)×8000, a subcarrier spacing ($\Delta f$) is $F_s/N_{FFT}$, a useful symbol time ($T_b$) is $1/\Delta f$, a CP time ($T_g$) is $G \cdot T_b$, an OFDMA symbol time ($T_s$) is $T_b+T_g$, and a sampling time is $T_b/N_{FFT}$.

Hereinafter, a wireless communication system into which a relay station is introduced will be described. The relay station may be introduced into the IEEE 802.16m system. The mobile station may be connected to the base station or the relay station and receive a service from the base station or the relay station to which it is connected.

In the IEEE 802.16m system, relay may be performed by a decode and forward (DF) paradigm. Both of the FDD and TDD schemes may be supported in the downlink and the uplink. The relay station may be operated in a time-division transmit and receive (TTR) mode or a simultaneous transmit and receive (STR) mode. In the TTR mode, access link communication between the relay station and the mobile station and relay link communication between the base station and the relay station are multiplexed in a time division multiplexing (TDM) scheme in a single radio frequency (RF) carrier. In the STR mode, in the case in which an access link and a relay link are sufficiently independent from each other, the access link communication and the relay link communication may be simultaneously performed.

In the IEEE 802.16m system, the relay station may be operated in a non-transparent mode. The non-transparent mode means a mode in which the relay stations forms an SFH and an A-MAP for subordinate stations and transmits an A-preamble, the SFH, and the A-MAP to the subordinate stations.

In the IEEE 802.16m system into which the relay station is introduced, a distributed scheduling model in which each base station or relay station schedules radio resources for a subordinate link may be used. In the case of the relay station, the scheduling of the resources is performed in resources allocated from the base station. The base station informs the relay station and the mobile station of a configuration of a frame structure. A radio frame may be divided into an access zone and a relay zone.

In the access zone, the base station and the relay station transmit a signal to the mobile station or receive a signal from the mobile station. In the relay zone, the base station transmits a signal to the relay station and the mobile station or receives a signal from the relay station and the mobile station. Frame structures of the base station and the relay station may be aligned in time. The base station and the relay station may simultaneously transmit the A-preamble, the SFH, and the A-MAP to the mobile station.

Figure 3:
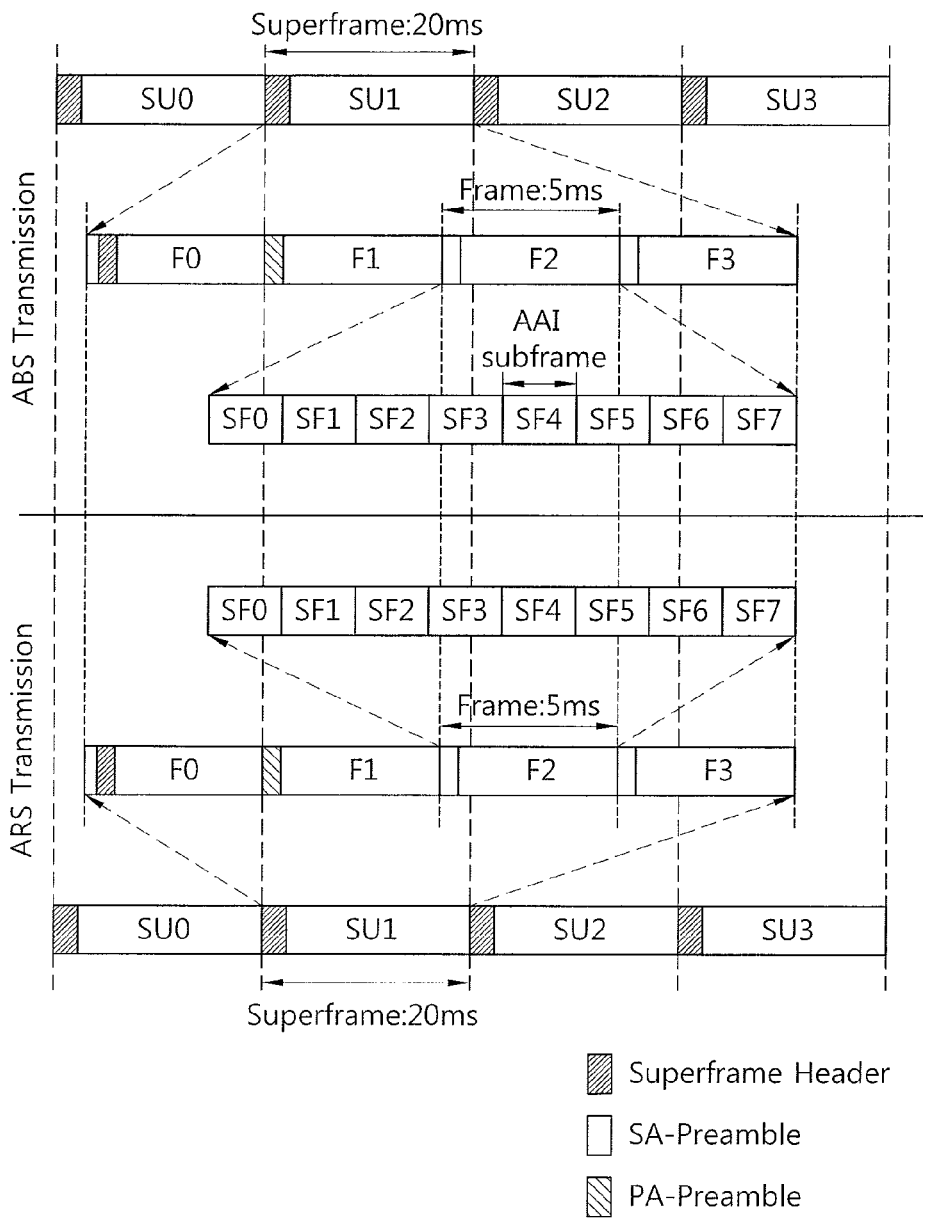
FIG. 3 shows an example of a basic frame structure of a system supporting a relay station.

FIG. 3 shows an example of a basic frame structure of a system supporting a relay station.

The system into which the relay station is introduced may use the OFDMA parameters of Table 1 as they are, similar to the base station. Superframes of the base station and the mobile station may be aligned in time and include the same number of frames and subframes. Each superframe of the relay station includes an SFH, and the SFH transmitted by the relay station has the same position and format as those of the SFH transmitted by the base station. A relay station preamble (an SA-preamble and a PA-preamble) is transmitted synchronously with a superordinate base station preamble.

In the system supporting the relay station, a base station frame may be divided into an access zone and a relay zone. Within a TDD frame and an FDD DL frame, the access zone may be positioned prior to the relay zone. Within an FDD UL frame, the relay zone may be positioned prior to the access zone. Durations of the access zone and the relay zone in the DL and the UL may be different from each other.

The access zone of the base station frame is configured of a DL access zone and a UL access zone, and the relay zone thereof is configured of a DL relay zone and a UL relay zone. The access zone of the base station frame is used only to communicate with the mobile station. The relay zone of the base station frame may be used to communicate with the relay station or used to communicate with the mobile station. The mobile station served by the base station rather than the relay station may transmit or receive data according to an existing frame structure in which the relay station is not introduced regardless of the access zone or the relay zone. However, in the case in which different permutations are used in the access zone and the relay zone, the mobile station may not communicate with the base station through relay zone. The base station transmits the signal to the subordinate relay station in the DL relay zone and receives the signal from the subordinate relay station in the UL relay zone.

The access zone of the relay station frame is configured of a DL access zone and a UL access zone, and the relay zone thereof is configured of a DL relay zone and a UL relay zone. The access zone of the relay station frame is used only to communicate with the mobile station. The relay station receives the signal from the superordinate base station in the DL relay zone and transmits the signal to the superordinate base station in the UL relay zone.

Configurations of the DL/UL access zones and the relay zone in the frame may be determined when the relay station or the mobile station receives a frame configuration index through the S-SFH SP1. The configurations of the DL/UL access zones and the relay zone in the frame may be determined through a broadcast message such as an AAI_SCD message, an AAI_ARS_CONFIG_CMD message, or the like. Configurations of some frames defined for basic communication between the base station and the mobile station may not be supplied in the system into which the relay station is introduced. In addition, the frame structure supporting the mobile station operated in the IEEE 802.16e system may also not be supplied in the system into which the relay station is introduced.

A relay transmit to receive transition interval (R-TTI) may be inserted into each relay station frame. The R-TTI may be inserted for an ARS transmit/receive transition gap (ARSTTG) and a round-trip delay (RTD) between the relay station and the superordinate station. In addition, a relay receive to transmit transition interval (R-RTI) may be inserted into each relay station frame. The R-RTI may be inserted for an ARS receive/transmit transition gap (ARSRTG) and a round-trip delay (RTD) between the relay station and the superordinate station.

Figure 4:
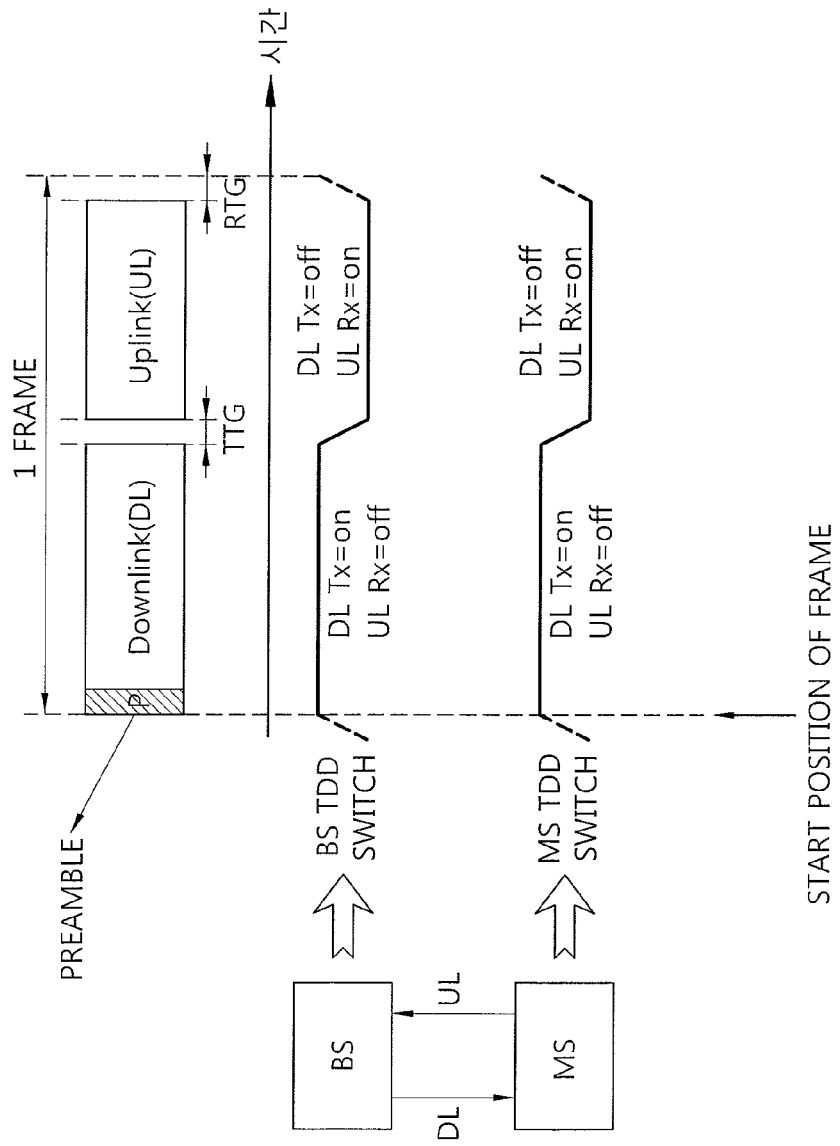
FIG. 4 shows examples of a configuration of a TDD frame and a control of a BS TDD switch and an MS TDD switch.

FIG. 4 shows examples of a configuration of a TDD frame and a control of a BS TDD switch and an MS TDD switch.

Referring to FIG. 4, the TDD frame includes a DL area and a UL area. A preamble may be transmitted prior to the DL area. A TTG may be positioned between the DL area and the UL area, and a RTG may be positioned between the UL area and a DL area of the next TDD frame. In the DL area, the base station performs DL transmission to the mobile station. At this time, a BS TDD switch is positioned at DL Tx=on and UL Rx=off. A MS TDD switch is positioned at DL Rx=on and UL Tx=off. In the UL area, the mobile station performs UL transmission to the base station. At this time, the BS TDD switch is positioned at DL Tx=off, and UL Rx=on. The MS TDD switch is positioned at DL Rx=off and UL Tx=on. The BS TDD switch and the MS TDD switch may be controlled by a BS TDD switch signal and an MS TDD switch signal, respectively.

Figure 5:
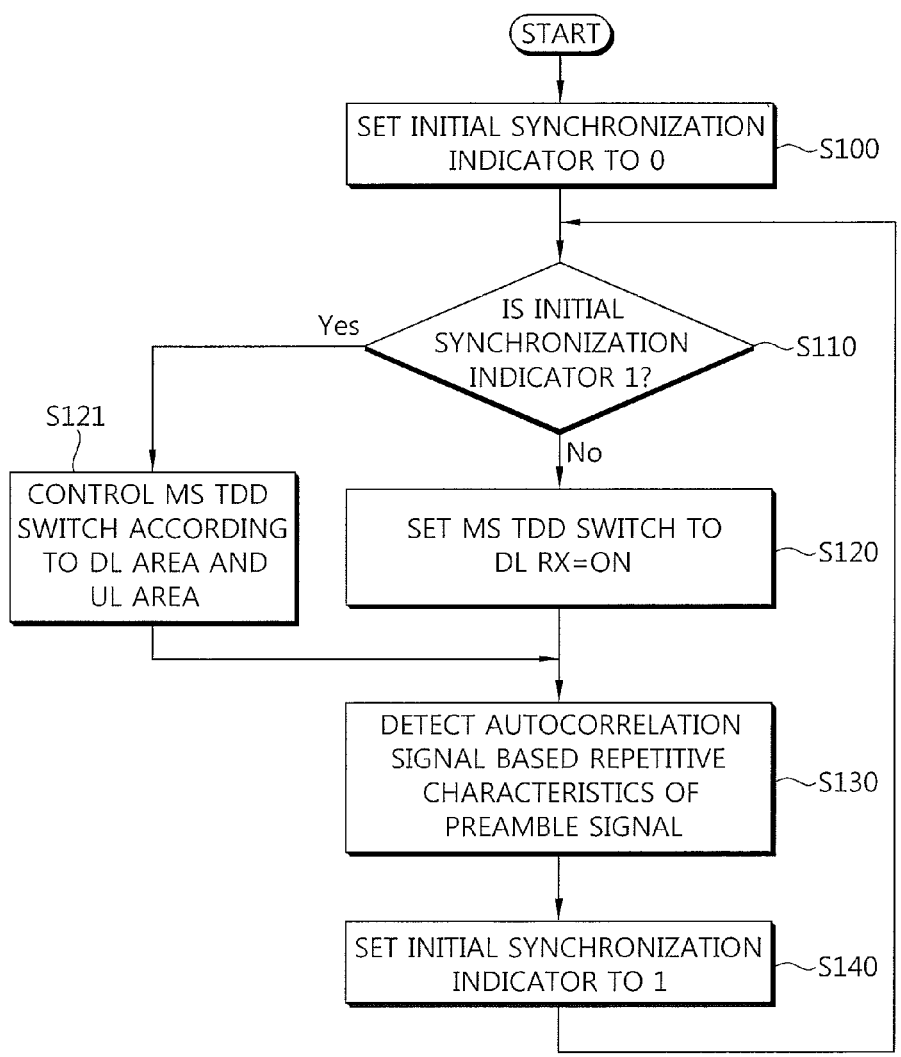
FIG. 5 shows an example of a method for acquiring initial synchronization using a preamble.

FIG. 5 shows an example of a method for acquiring initial synchronization using a preamble.

Referring to FIG. 5, in step (S100), an initial synchronization indicator indicating an initial synchronization state is set to 0. In step (S110), the mobile station compares whether a value of the initial synchronization indicator is 1. In the state in which the initial synchronization has not yet been acquired, that is, in the case in which the value of the initial synchronization indicator is 0, the mobile station sets the MS TDD switch to DL Rx=on in step (S120). To this end, the MS TDD switch signal may be generated. In the state in which the initial synchronization is acquired, that is, in the case in which the value of the initial synchronization indicator is 1, the mobile station controls the MD TDD switch according to the DL area and the UL area as shown in FIG. 4 in step (S121). To this end, the MS TDD switch signal as shown in FIG. 4 may be generated. In step (S130), the mobile station detects an autocorrelation signal based on repetitive characteristics of a preamble received from the base station and determines a start position of a frame according to a peak of an output of the autocorrelation signal. After the mobile station determines the start position of the frame, the mobile station sets the value of the initial synchronization indicator to 1 in step (S140) and then repeats the above-mentioned process.

Through the above-mentioned process, the initial synchronization between the base station and the mobile station may be acquired, and the mobile station may control the MS TDD switch according to the DL area and the UL area based on the start position of the frame. For reference, since the base station recognizes a reference time in advance and transmits data according to the reference time, it needs not to search the start position of the frame.

Figure 6:
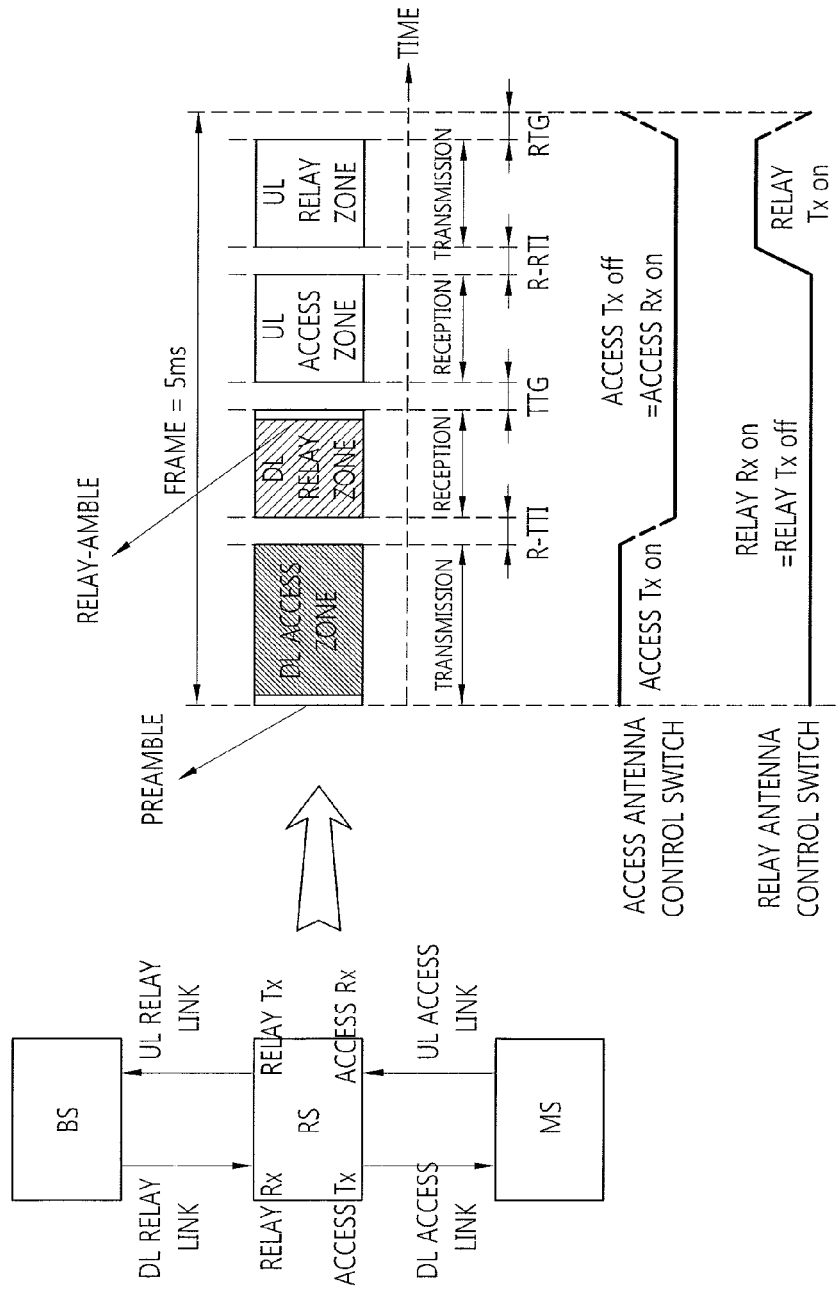
FIG. 6 shows examples of a configuration of a TDD frame and a control of an antenna control switch of a relay station in the case in which the relay station is introduced.

FIG. 6 shows examples of a configuration of a TDD frame and a control of an antenna control switch of a relay station in the case in which the relay station is introduced.

Referring to FIG. 6, the TDD frame includes a DL area and a UL area. The DL area includes a DL access zone and a DL relay zone. The DL access zone is an area for communication between the relay station and the mobile station, and the DL relay zone is an area for communication between the base station and the relay station. The UL area includes a UL access zone and a UL relay zone. The UL access zone is an area for communication between the relay station and the mobile station, and the UL relay zone is an area for communication between the base station and the relay station. A preamble may be transmitted prior to the DL area. The preamble may be transmitted per each frame. In addition, there may be a relay-amble (R-amble). It is assumed in FIG. 6 that the relay-amble is positioned after the DL relay zone, but is not limited thereto. The relay-amble may not be transmitted per each frame, but be transmitted according to a predetermined rule. An R-TTI may be positioned between the DL access zone and the DL relay zone, a TTG may be positioned between the DL area and the UL area, an R-RTI may be positioned between the UL access zone and the UL relay zone, and an RTG may be positioned between the UL area and a DL area of the next TDD frame. Further, although it is assumed in FIG. 6 that the DL access zone is positioned prior to the DL relay zone and the UL access zone is positioned prior to the UL relay zone, a frame configuration is not limited thereto. In some cases, the relay zone may be positioned prior to the access zone.

In the DL access zone, the relay station performs DL transmission to the mobile station. At this time, an access antenna control switch is positioned at access Tx=on. In remaining DL relay zone, UL access zone, and UL access zone, the access antenna control switch is positioned at access Tx=off. That is, it is positioned at access Rx=on. To this end, an access antenna control switch signal may be generated. In the UL relay zone, the relay station performs UL transmission to the base station. At this time, a relay antenna control switch is positioned at relay Tx=on. In remaining DL access zone, DL relay zone, and UL access zone, the relay antenna control switch is positioned at relay Tx=off. That is, it is positioned at relay Rx=on. To this end, a relay antenna control switch signal may be generated.

In the case in which the relay station is introduced, the mobile station may acquire the initial synchronization using the relay-amble as well as the preamble in acquiring the initial synchronization. However, a method for acquiring initial synchronization using a relay-amble has not yet been discussed. Therefore, a method for efficiently acquiring initial synchronization using a relay-amble in a wireless communication system into which a relay station is introduced has been demanded.

The relay station does not recognize a start position of a frame when power is initially turned on or before the initial synchronization is acquired. The relay station receives all of the signals coming from the base station in the DL area. Therefore, the relay station may receive both of the preamble and the relay-amble. The relay station may detect the autocorrelation signals based on repetitive characteristics of the preamble and the relay-amble received from the base station. Here, the preamble is a signal transmitted per each frame, and the relay-amble is a signal transmitted according to a predetermined rule as described in a standard such as the IEEE 802.16j. Therefore, the relay station may distinguish whether the output values of the detected autocorrelation signals are values by the preamble or values by the relay-amble and determine the start position of the frame based on the distinguished information. That is, the relay station may determine the start position of the frame based on the peak of the autocorrelation signals by the preamble and the peak of the autocorrelation signals by the relay-amble to acquire the initial synchronization.

After the relay station acquires the initial synchronization, it controls the antenna control switch as shown in FIG. 6. That is, the access antenna control switch is positioned at access Tx=on in the DL access zone and positioned at access Tx=off in the remaining DL relay zone, UL access zone, and UL relay zone. To this end, the access antenna control switch signal may be generated. The relay antenna control switch is positioned at relay Tx=on in the UL relay zone and positioned at relay Tx=off in the remaining DL access zone, DL relay zone, and UL access zone. To this end, the relay antenna control switch signal may be generated. In the case in which the access antenna control switch and the relay antenna control switch are set as described above, the relay station may no longer receive the preamble and may receive only the relay-amble. Therefore, from this moment, the relay station may detect the autocorrelation signals based on repetitive characteristics of the relay-amble received from the base station. The peak of the autocorrelation signal is only by the relay-amble. Then, the relay station may determine the start position of the frame based on the peak of the autocorrelation signal indicated by the relay-amble and control the access antenna control switch and the relay antenna control switch based on the determined start position of the frame. That is, the present invention suggests that the start position of the frame is determined based on the based on the peak of the autocorrelation signal indicated by the relay-amble and the antenna control switches are set based on the determined start position of the frame, using a feature that the relay-amble may be received before and after the initial synchronization is acquired.

Figure 7:
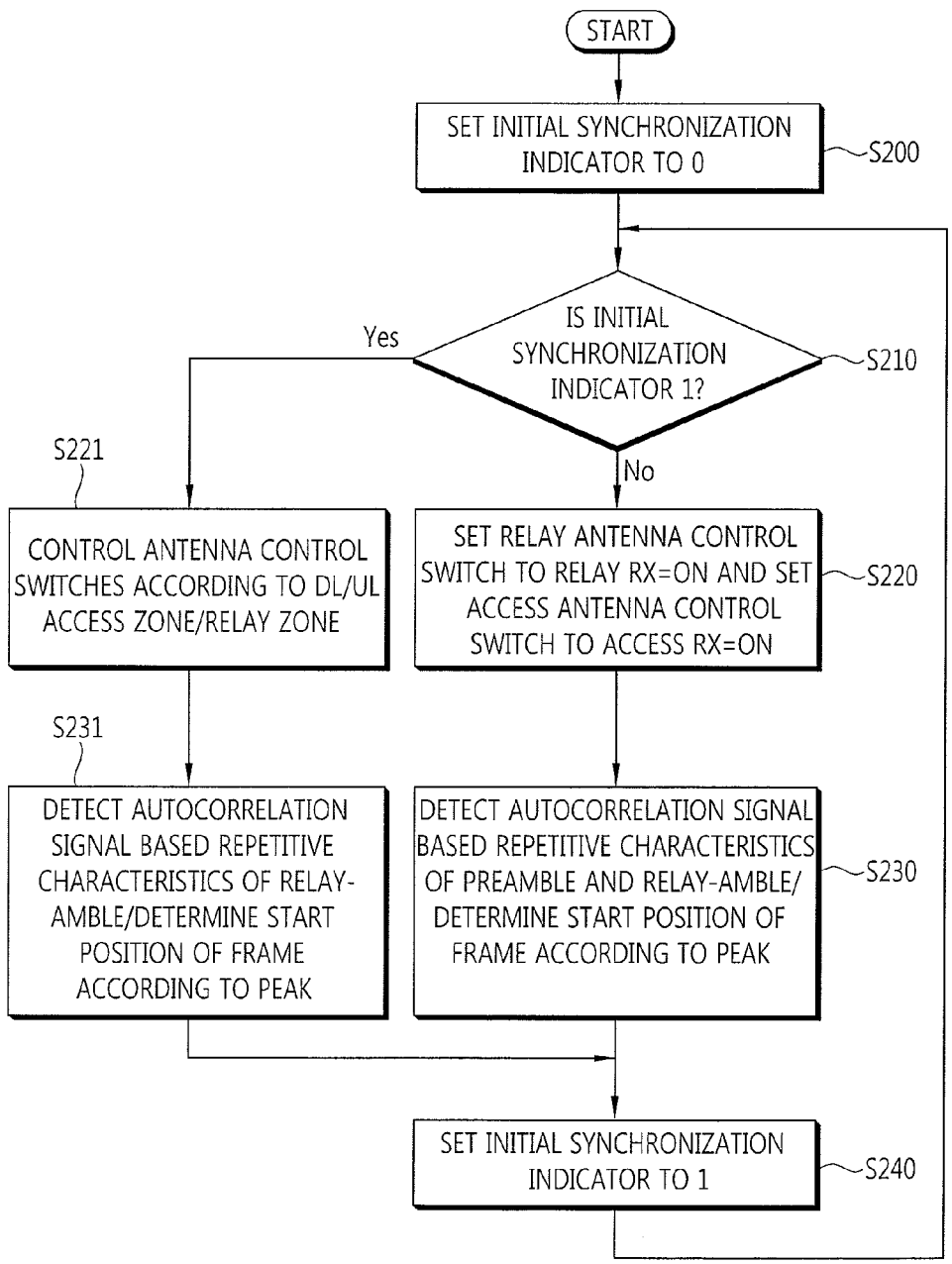
FIG. 7 shows a method for acquiring initial synchronization according to an exemplary embodiment of the present invention.

FIG. 7 shows a method for acquiring initial synchronization according to an exemplary embodiment of the present invention.

Referring to FIG. 7, in step (S200), an initial synchronization indicator indicating an initial synchronization acquiring state is set to 0. In step (S210), the relay station compares whether a value of the initial synchronization indicator is 1.

In the state in which the initial synchronization has not yet been acquired, that is, in the case in which the value of the initial synchronization indicator is 0, the relay station sets the relay antenna control switch to relay Rx=on and sets the access antenna control switch to access Rx=on in step (S220). To this end, the access antenna control switch signal and the relay antenna control switch signal may be generated. Therefore, the relay station may receive both of the preamble and the relay-amble from the base station. In addition, the relay station may not transmit an unnecessary signal to the base station or the mobile station. In step (S230), the relay station detects the autocorrelation signal based on the repetitive characteristics of the preamble and the relay-amble received from the base station and determines the start position of the frame according to the peak of the output of the autocorrelation signal.

In the state in which the initial synchronization is acquired, that is, in the case in which the value of the initial synchronization indicator is 1, the relay station sets the antenna control switches according to the DL access zone, the DL relay zone, the UL access zone, and the UL relay zone as shown in FIG. 6 in step (S221). To this end, the access antenna control switch signal and the relay antenna control switch signal may be generated. In step (S231), the relay station detects the autocorrelation signal based on the repetitive characteristics of the relay-amble received from the base station and determines the start position of the frame according to the peak of the output of the autocorrelation signal.

After the relay station determines the start position of the frame, the relay station sets the value of the initial synchronization indicator to 1 in step (S240) and then repeats the above-mentioned process. Through the above-mentioned process, the initial synchronization may be acquired, and the relay station may control the antenna control switches based on the start position of the frame.

Figure 8:
FIG. 8 shows an example of a method for outputting an autocorrelation signal by the method for acquiring initial synchronization according to the exemplary embodiment of the present invention.

FIG. 8 shows an example of a method for outputting an autocorrelation signal by the method for acquiring initial synchronization according to the exemplary embodiment of the present invention. The autocorrelation signal may be obtained by continuously receiving reception signals and delay signals generated by delaying the reception signals by a predetermined time, multiplying them together, and accumulating and summing the multiplied signals by a size of an autocorrelation window.

Figure 9:
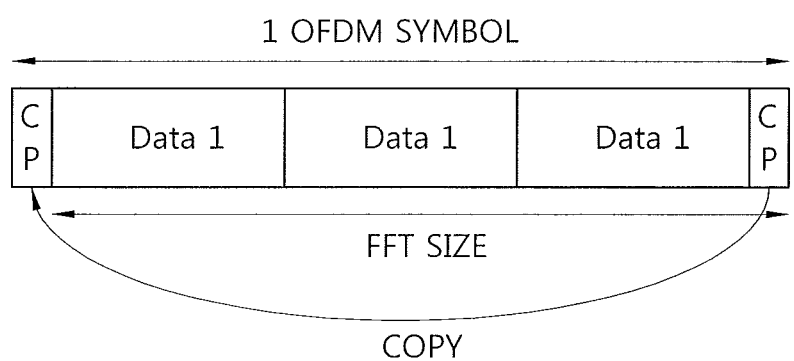
FIG. 9 shows an example of a configuration of a preamble or a relay-amble received by the method for acquiring initial synchronization according to the exemplary embodiment of the present invention.

FIG. 9 shows an example of a configuration of a preamble or a relay-amble received by the method for acquiring initial synchronization according to the exemplary embodiment of the present invention. The preamble or the relay-amble may be transmitted in a single OFDM symbol. Data are repeated three times in the preamble and the relay-amble and a cyclic prefix (CP) is positioned prior to the data. The CP may be generated by copying a final portion of the data as it is.

Figure 10:
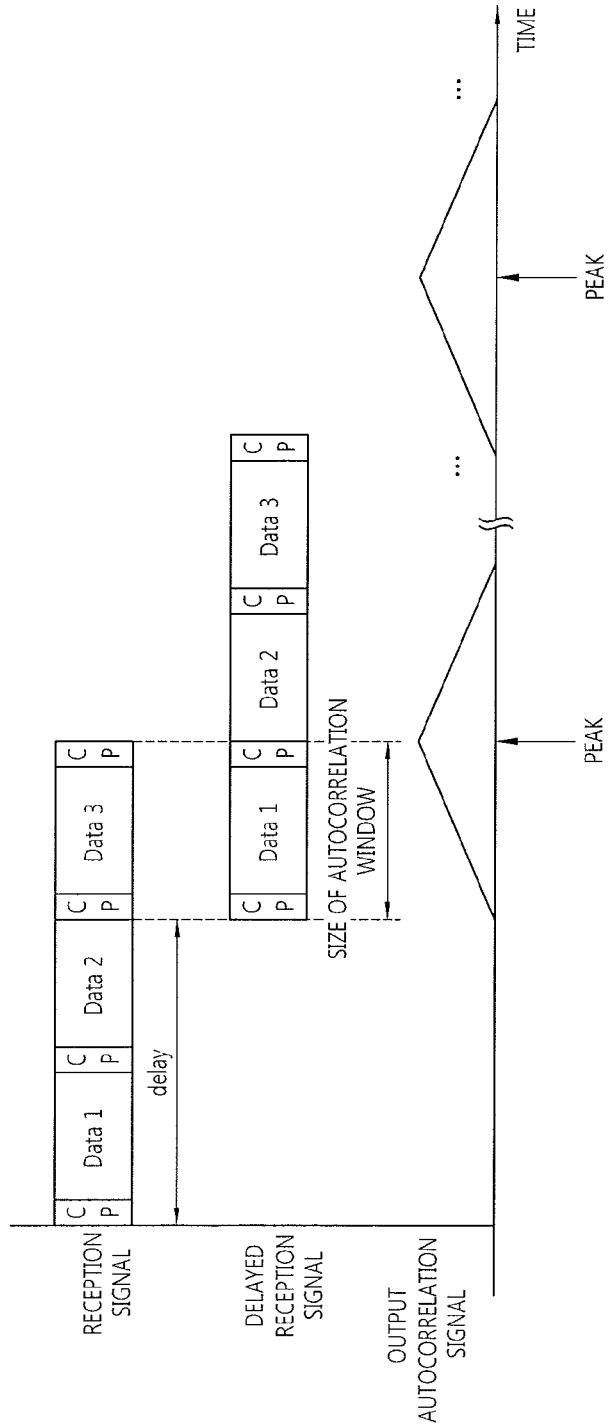
FIG. 10 shows an example of the autocorrelation signal detected by the method for acquiring initial synchronization according to the exemplary embodiment of the present invention.

FIG. 10 shows an example of the autocorrelation signal detected by the method for acquiring initial synchronization according to the exemplary embodiment of the present invention. Referring to FIG. 10, a reception signal is delayed by the double of a data period. The peak of the output of the autocorrelation signal appears at a portion at which the reception signal ends, that is, a final portion of an OFDM symbol. In the case in which the reception signal is delayed by the double of the data period as shown in FIG. 10, a size of the autocorrelation window is minimized, such that a multiplying amount may be minimized in detecting the autocorrelation signal.

Figure 11:
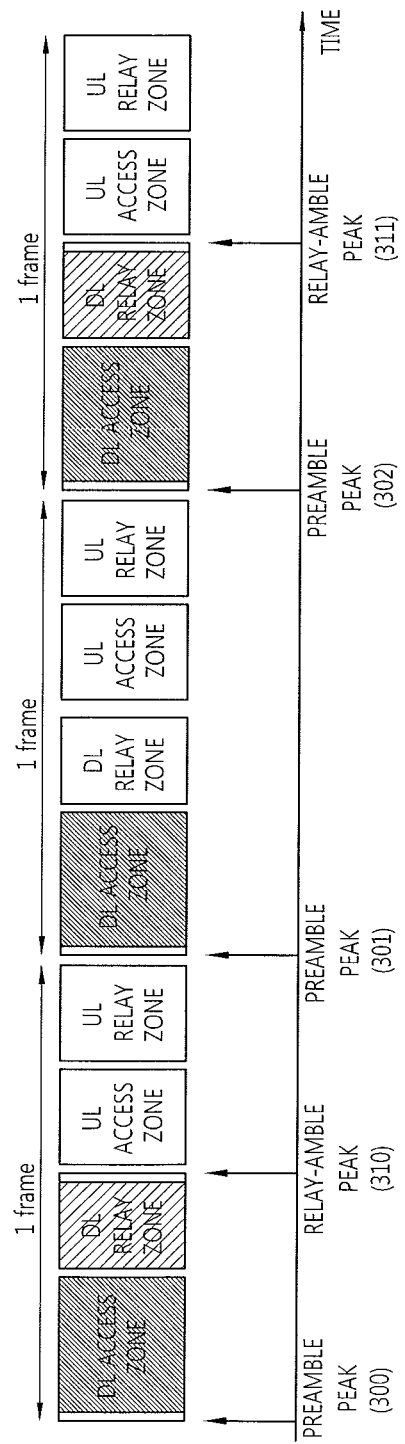
FIG. 11 shows another example of the autocorrelation signal detected by the method for acquiring initial synchronization according to the exemplary embodiment of the present invention.

FIG. 11 shows another example of the autocorrelation signal detected by the method for acquiring initial synchronization according to the exemplary embodiment of the present invention.

Referring to FIG. 11, it is assumed that the preamble is transmitted per each frame and the relay-amble is transmitted per every two frames. Therefore, when the autocorrelation signal is detected, the peaks 300, 301, and 302 by the preamble appear per each frame, and the peaks 310 and 311 by the relay-amble appear per every two frames. As described above, the relay-amble is not transmitted per each frame, but is transmitted according to a predetermined rule, such that a predetermined pattern is formed with respect to the peaks of the autocorrelation signal. That is, the preamble peak 300, the relay-amble peak 310, and the preamble peak 301 continuously appear, and the preamble peak 302 and the relay-amble peak 311 also continuously appear. The secondly appearing peak among the above-mentioned peaks is a peak by the relay-amble. Therefore, the relay station may distinguish whether the peak of the autocorrelation signal is a peak by the preamble or a peak by the relay-amble and determine the start position of the frame based on the distinguished information. In addition, the relay station may determine a start position of the preamble by the same calculating process before and after the initial synchronization is acquired. Although it is assumed in the exemplary embodiment of the present invention that the relay-amble is transmitted per every two frames, the present invention is not limited thereto. That is, a pattern for the peaks of the autocorrelation signal may be changed according to a position at which the relay-amble is transmitted.

Figure 12:
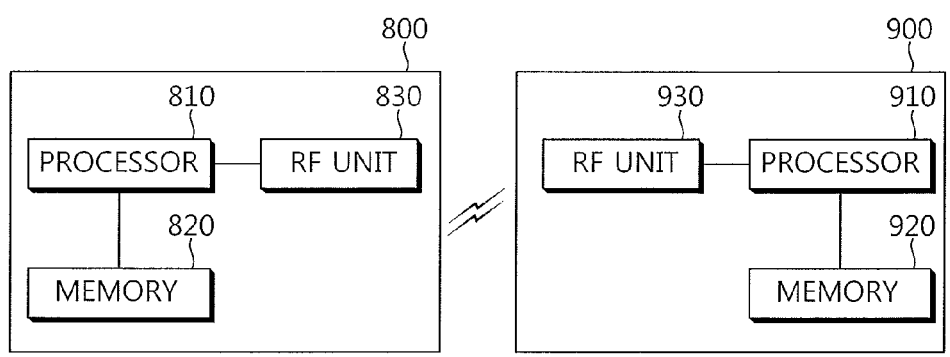
FIG. 12 is a block diagram of a wireless communication system in which the exemplary embodiment of the present invention is implemented.

FIG. 12 is a block diagram of a wireless communication system in which the exemplary embodiment of the present invention is implemented.

A base station 800 includes a processor 810, a memory 820, and a radio frequency (RF) unit 830. The processor 810 implements the suggested function, process, and/or method. Layers of a radio interface protocol may be implemented by the processor 810. The memory 820 is connected to the process 810 to store various kinds of information for driving the processor 810. The RF unit 830 is connected to the processor 810 to transmit and/or receive a wireless signal.

A relay station 900 includes a processor 910, a memory 920, and an RF unit 930. The processor 910 implements the suggested function, process, and/or method. Layers of a radio interface protocol may be implemented by the processor 910. The memory 920 is connected to the process 910 to store various kinds of information for driving the processor 910. The RF unit 930 is connected to the processor 910 to transmit and/or receive a wireless signal.

The processors 810 and 910 may include an application-specific integrated circuit (ASIC), other chipsets, a logical circuit, and/or a data processing apparatus. The memories 820 and 920 may include a read-only memory (ROM), a random access memory (RAM), a flash memory, a memory card, a storage medium, and/or other storage apparatuses. The RF units 830 and 930 may include a baseband circuit for processing the wireless signal. When the embodiment is implemented by software, the above-mentioned method may be implemented by a module (a process, a function, or the like) that performs the above-mentioned function. The module may be stored in the memories 820 and 920 and be performed by the processors 810 and 910. The memories 810 and 920 may be disposed at an inner portion or an outer portion of the processors 810 and 910 and may be connected to the processors 810 and 910 by widely known various units.

As set forth above, according to the exemplary embodiments of the present invention, the initial synchronization may be stably acquired using the relay-amble before and after the initial synchronization is acquired.

In the above-mentioned exemplary system, although the methods have described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and modifications belong to the following claims.

What is claimed is:

1. A method for acquiring initial synchronization by a relay station in a wireless communication system, the method comprising:
   determining whether or not the initial synchronization is acquired;
   determining a start position of a frame using a peak of an autocorrelation signal detected based on both a preamble and a relay-amble (R-amble) received from a base station in the case in which the initial synchronization is not acquired; and
   determining the start position of the frame using a peak of an autocorrelation signal detected based on only the relay-amble received from the base station in the case in which the initial synchronization is acquired, wherein the preamble and R-amble are within the frame,
   wherein the preamble is within a downlink (DL) access zone within the frame and the R-amble is within a DL relay zone within the frame, and
   wherein the determining of whether or not the initial synchronization is acquired is indicated by an initial synchronization indicator.

2. The method of claim 1, further comprising setting a relay antenna control switch to relay Rx=on and setting an access antenna control switch to access Rx=on in the case in which the initial synchronization is not acquired.

3. The method of claim 1, further comprising setting a relay antenna control switch to relay Tx=on in a UL relay zone and setting an access antenna control switch to access Tx=on in a DL access zone in the case in which the initial synchronization is acquired.

4. The method of claim 3, wherein the UL relay zone is an area for the relay station to perform uplink transmission to the base station, and the DL access zone is an area for the relay station to perform downlink transmission to a mobile station.

5. The method of claim 1, wherein when a value of the initial synchronization indicator is 0, it indicates that the initial synchronization is not acquired, and when the value of the initial synchronization indicator is 1, it indicates that the initial synchronization is acquired.

6. The method of claim 1, further comprising, after the determining of the start position of the frame, setting a value of the initial synchronization indicator to 1.

7. The method of claim 1, wherein the start position of the frame is positioned at a time elapsing from a time at which the peak of the autocorrelation signal detected based on the relay-amble is positioned by a transmit/receive transition gap (TTG)+a duration of a UL access zone+a relay transmit to receive transition interval (R-TTI)+a duration of a UL relay zone+a relay receive to transmit transition interval (R-RTI).

8. The method of claim 1, wherein the preamble or the relay-amble is received in a single OFDM symbol.

9. The method of claim 1, wherein the preamble or the relay amble includes a three times repeated data period and a cyclic prefix (CP) positioned prior to the data period, and the CP is generated by copying a portion of the data period.

10. A relay station in a wireless communication system, the relay station comprising:
   a radio frequency (RF) unit transmitting or receiving a radio signal; and
   a processor connected to the RF unit, wherein the processor is configured to:
      determine whether or not initial synchronization is acquired;
      determine a start position of a frame using a peak of an autocorrelation signal detected based on a both preamble and a relay-amble (R-amble) received from a base station in the case in which the initial synchronization is not acquired; and
      determine the start position of the frame using a peak of an autocorrelation signal detected based on only the relay-amble received from the base station in the case in which the initial synchronization is acquired,
   wherein the preamble and R-amble are within the frame,
   wherein the preamble is within a downlink (DL) access zone within the frame and the R-amble is within a DL relay zone within the frame, and
   wherein the determining of whether or not the initial synchronization is acquired is indicated by an initial synchronization indicator.

11. The relay station of claim 10, wherein the processor is further configured to set a relay antenna control switch to relay Rx=on and setting an access antenna control switch to access Rx=on in the case in which the initial synchronization is not acquired.

12. The relay station of claim 10, wherein the processor is further configured to set a relay antenna control switch to relay Tx=on in a UL relay zone and setting an access antenna control switch to access Tx=on in a DL access zone in the case in which the initial synchronization is acquired.

13. The relay station of claim 12, wherein the UL relay zone is an area for the relay station to perform uplink transmission to the base station, and the DL access zone is an area for the relay station to perform downlink transmission to a mobile station.

14. The relay station of claim 10, wherein a value of the initial synchronization indicator is 0, it indicates that the initial synchronization is not acquired, and when the value of the initial synchronization indicator is 1, it indicates that the initial synchronization is acquired.

15. The relay station of claim 10, wherein the processor is further configured to, after the determining of the start position of the frame, set a value of the initial synchronization indicator to 1.

16. The relay station of claim 10, wherein the start position of the frame is positioned at a time elapsing from a time at which the peak of the autocorrelation signal detected based on the relay-amble is positioned by a transmit/receive transition gap (TTG)+a duration of a UL access zone+a relay transmit to receive transition interval (R-TTI)+a duration of a UL relay zone+a relay receive to transmit transition interval (R-RTI).

17. The relay station of claim 10, wherein the preamble or the relay-amble is received in a single OFDM symbol.

18. The relay station of claim 10, wherein the preamble or the relay amble includes a three times repeated data period and a cyclic prefix (CP) positioned prior to the data period, and the CP is generated by copying a portion of the data period.

* * * * *